US008394751B2

(12) United States Patent
Hawes, III et al.

(10) Patent No.: US 8,394,751 B2
(45) Date of Patent: Mar. 12, 2013

(54) ORGANIC RESIDUE REMOVER COMPOSITION

(75) Inventors: Charles L. Hawes, III, Cordova, TN (US); Dennis E. Shireman, Marion, AR (US); Leonard R. Clark, Memphis, TN (US)

(73) Assignee: W. M. Barr & Company, Memphis, TN (US)

( * ) Notice: Subject to any disclaimer, the term of this patent is extended or adjusted under 35 U.S.C. 154(b) by 426 days.

(21) Appl. No.: 12/696,859

(22) Filed: Jan. 29, 2010

(65) Prior Publication Data

US 2011/0190187 A1    Aug. 4, 2011

(51) Int. Cl.
*C11D 7/50* (2006.01)
(52) U.S. Cl. .......... 510/365; 510/417; 510/506
(58) Field of Classification Search .......... 510/365, 510/417, 506
See application file for complete search history.

(56) References Cited

U.S. PATENT DOCUMENTS

| | | | |
|---|---|---|---|
| 3,839,234 A | 10/1974 | Roscoe | |
| 3,960,742 A | 6/1976 | Leonard | |
| 4,594,111 A | 6/1986 | Coonan | |
| 4,673,524 A | 6/1987 | Dean | |
| 5,080,831 A * | 1/1992 | VanEenam | 510/365 |
| 5,158,710 A * | 10/1992 | VanEenam | 510/264 |
| 5,290,472 A | 3/1994 | Michael | |
| 5,364,551 A | 11/1994 | Lentsch et al. | |
| 5,419,848 A | 5/1995 | VanEenam | |
| 5,454,984 A | 10/1995 | Graubart et al. | |
| 5,510,051 A | 4/1996 | Lam | |
| 5,585,341 A * | 12/1996 | Van Eenam | 510/365 |
| 5,634,979 A | 6/1997 | Carlson et al. | |
| 5,816,446 A | 10/1998 | Steindorf et al. | |
| 5,849,682 A * | 12/1998 | Van Eenam | 510/254 |
| 5,874,393 A * | 2/1999 | Drapier et al. | 510/417 |
| 5,962,383 A | 10/1999 | Doyel et al. | |
| 5,977,042 A * | 11/1999 | Hernandez et al. | 510/201 |
| 6,010,995 A | 1/2000 | Van Eenam | |
| 6,121,228 A * | 9/2000 | Drapier et al. | 510/417 |
| 6,395,103 B1 * | 5/2002 | Machac et al. | 134/40 |
| 6,423,677 B1 * | 7/2002 | Van Eenam | 510/365 |
| 6,479,445 B1 * | 11/2002 | Machac et al. | 510/206 |
| 6,833,341 B2 * | 12/2004 | Machac et al. | 510/202 |
| 6,833,345 B2 * | 12/2004 | Machac et al. | 510/365 |
| 8,119,588 B2 * | 2/2012 | Bernhardt et al. | 510/495 |
| 2002/0010117 A1 | 1/2002 | McDonald | |
| 2002/0058600 A1 * | 5/2002 | Van Eenam | 510/408 |
| 2002/0111284 A1 * | 8/2002 | Machac et al. | 510/245 |
| 2003/0089381 A1 | 5/2003 | Manning, Jr. | |
| 2003/0119686 A1 * | 6/2003 | Machac et al. | 510/201 |
| 2005/0096245 A1 * | 5/2005 | Hei et al. | 510/383 |
| 2005/0227893 A1 | 10/2005 | Johnson et al. | |
| 2005/0245412 A1 | 11/2005 | Shah et al. | |
| 2005/0256022 A1 | 11/2005 | May et al. | |
| 2005/0277572 A1 | 12/2005 | Heise et al. | |
| 2007/0155644 A1 | 7/2007 | Muse et al. | |
| 2007/0173425 A1 | 7/2007 | Okumura et al. | |
| 2008/0023031 A1 | 1/2008 | Kellar et al. | |
| 2008/0227681 A1 | 9/2008 | Greenberg | |
| 2008/0293612 A1 | 11/2008 | Kellar et al. | |
| 2009/0011132 A1 | 1/2009 | Thompson | |
| 2009/0233838 A1 | 9/2009 | Zaki | |
| 2009/0281012 A1 | 11/2009 | Trivedi et al. | |
| 2012/0128614 A1 * | 5/2012 | Rieth et al. | 424/70.1 |

* cited by examiner

*Primary Examiner* — Gregory Webb
(74) *Attorney, Agent, or Firm* — Buchanan Ingersoll & Rooney PC

(57) ABSTRACT

Organic residue remover composition useful to remove from very oily type soils to very watery contaminants from various surfaces, obtained by mixing: component (a): at least one water insoluble hydrophobic compound, component (b): at least one water soluble glycol ether, component (c): at least one water insoluble glycol ether, component (d): at least one aromatic alcohol, component (e): at least one surfactant, optionally component (f): at least one hydrotrope, and component (g): water, wherein each component or an ingredient thereof is different from the other components or ingredients thereof in the organic residue remover composition.

15 Claims, No Drawings

ORGANIC RESIDUE REMOVER COMPOSITION

SUMMARY

Described herein is a multipurpose organic residue remover composition useful to remove from very oily type soils to very watery contaminants from various surfaces, obtained by mixing: component (a): at least one water insoluble hydrophobic compound, component (b): at least one water soluble glycol ether, component (c): at least one water insoluble glycol ether, component (d): at least one aromatic alcohol, component (e): at least one surfactant, optionally component (f): at least one hydrotrope, and component (g): water, wherein each component or an ingredient thereof is different from the other components or ingredients thereof in the organic residue remover composition.

DETAILED DESCRIPTION OF PREFERRED EMBODIMENTS

Described herein is a cleaning product which can be used to remove tough messes in the home, garage or workshop. Such messes include gummy and sticky materials like adhesive and glue, grease, tar, oil, ink, dried paint, tough stains, and food stains, such as ketchup, cool-aid and coffee, from various hard surfaces such as wood, ceramic, concrete and plastic, or soft surfaces like carpet, clothing and upholstery. For example, it can be used to remove crayon, varnish, gum, candle wax, scuff marks, caulk, lipstick and makeup, tar, bugs, tree sap and other hard to remove materials from walls, tables, floors, furniture, tools, carpet, clothing and upholstery.

Component (a): at Least One Water Insoluble Hydrophobic Compound

Component (a) acts as a remover for various organic residues from the surface to be cleaned. For example, the at least one water insoluble hydrophobic compound includes water insoluble esters, fatty acid esters, mineral oil, silicone oil, dibasic esters, triglycerides, and sorbitan esters. In one embodiment, the hydrophobic compound is a methyl ester of fatty acid having 12 to 20 carbon atoms, or a mixture thereof. In a preferred embodiment, the hydrophobic compound is methyl soyate (or soy methyl ester).

The content of the hydrophobic compound to be used in the organic residue remover composition may range from about 2 wt. % to about 10 wt. %, preferably from about 4 wt % to about 8 wt. %, and more preferably from about 5 wt. % to about 7 wt. %, based on the total weight of the organic residue remover composition. When the content of the hydrophobic compound is used in an amount of about 8 wt. % or more, phase separation may occur in the organic residue remover composition. Though phase separation may be reduced or avoided by addition of additional non-volatile surfactants, this may result in residue being left on the surfaces cleaned. Preferably, the hydrophobic compound is 5, 6 or 7 wt. % methyl soyate.

Component (b): at Least One Water Soluble Glycol Ether

Component (b) acts as the solvent for various ingredients in the organic residue remover composition and a remover of various organic residues from a surface to be cleaned.

Examples of suitable water soluble glycol ethers include, but are not limited to, ethylene glycol monobutyl ether, diethylene glycol monobutyl ether, propylene glycol monopropyl ether, propylene glycol monomethyl ether, dipropylene glycol monomethyl ether, ethylene glycol monopropyl ether, and mixtures thereof.

The content of the at least one water soluble glycol ether to be used in the organic residue remover composition may range from about 3 wt. % to about 10 wt. %, and preferably from about 4.5 wt. % to about 8 wt. %, based on the total weight of the organic residue remover composition.

The term "VOC," as used herein, stands for "volatile organic compound." The term "low vapor pressure VOC," as used herein, denotes basically organic compounds that do not evaporate. According to California Air Resources Board (CARB) regulations, a low vapor pressure VOC must either have at least 13 carbon atoms per molecule, or have a boiling point above 216° C., or have a vapor pressure less than 0.1 mm of Hg at 20° C.

In one embodiment, the water soluble glycol ether comprises a low vapor pressure VOC water soluble glycol ether and a VOC water soluble glycol ether. In such embodiment, the total content of component (b) may be about 3 to about 10 wt. % with the content of the low vapor pressure VOC from about 1 wt. % to about 10 wt. %, and preferably from about 1.5 wt. % to about 3 wt. %, based on the total weight of the composition; and the content of the VOC from 0 wt. % (VOC-free) to about 6 wt. %, preferably from about 2 wt. % to about 5 wt. %, and more preferably from about 3 wt. % to about 4 wt. %, based on the total weight of the composition.

In a preferred embodiment, the water soluble glycol ether includes 1, 2 or 3 wt. % of a low VOC compound, such as diethylene glycol monobutyl ether, and 2, 3 or 4 wt. % of a VOC compound, such as ethylene glycol monobutyl ether (i.e., 2-butoxyethanol).

Component (c): at Least One Water Insoluble Glycol Ether

Examples of suitable water insoluble glycol ethers include, but are not limited to, propylene glycol monophenyl ether, propylene glycol monobutyl ether, dipropylene glycol monobutyl ether, and propylene glycol mono-tert-butyl ether. In one embodiment, the water insoluble glycol ether is propylene glycol monophenyl ether. In a further embodiment, the water insoluble glycol ether is propylene glycol monophenyl ether, for example, DOWANOL™ PPH available from The Dow Chemical Company, Midland Mich.

The content of the water insoluble glycol ether to be used in the organic residue remover composition may range from about 1 wt. % to about 4 wt. %, and preferably from about 1.5 wt. % to about 3 wt. %, based on the total weight of the organic residue remover composition. Preferably, the water insoluble glycol ether is 1, 2 or 3 wt. % propylene glycol monophenyl ether.

Component (d): at Least One Aromatic Alcohol

Preferably, the aromatic alcohol is halogen free. In one embodiment, the aromatic alcohol is a phenyl group-containing alkyl alcohol. Examples of suitable aromatic alcohols include, but are not limited to, benzyl alcohol, methyl benzyl alcohols, and mixtures thereof. In one embodiment, the aromatic alcohol is benzyl alcohol.

The content of the aromatic alcohol to be used in the composition may range from about 7 wt. % to about 10 wt. %, and preferably from about 7.5 wt. % to about 9 wt. %, based on the total weight of the organic residue remover composition. When the content of the aromatic alcohol exceeds about 10 wt. %, the cost for manufacturing the organic residue composition becomes high. Preferably, the aromatic alcohol is 7, 8 or 9 wt. % benzyl alcohol.

Component (e): at Least One Surfactant

The surfactant used in the organic residue remover composition may not only increase the solubility in water of other water insoluble components in the composition, but also provide better wetting properties by lowering the surface tension of the composition, thus insuring sufficient coverage and a more uniform coating on the surface to be cleaned. Moreover, the surfactant may assist, initiate or promote transformation from the initially formed 2-phase agglomerate or macroglobules to emulsion, thus facilitating removal and suspension of the targeted substances on the cleaning surface.

The surfactant may be an anionic, nonionic, cationic or amphoteric surfactant, or a mixture thereof.

Examples of suitable anionic surfactants include, but are not limited to, dodecylbenzene sulfonic acid, sodium alkylbenzene sulfonate, sodium dodecylbenzene sulfonate, potassium dodecylbenzene sulfonate, triethanolamine dodecylbenzene sulfonate, morpholinium dodecylbenzene sulfonate, ammonium dodecylbenzene sulfonate, isopropylamine dodecylbenzene sulfonate, sodium tridecylbenzene sulfonate, sodium dinonylbenzene sulfonate, potassium didodecylbenzene sulfonate, dodecyl diphenyloxide disulfonic acid, sodium dodecyl diphenyloxide disulfonate, isopropylamine decyl diphenyloxide disulfonate, sodium hexadecyloxypoly(ethyleneoxy)(10)ethyl sulfonate, potassium octylphenoxypoly(ethyleneoxy)(9)ethyl sulfonate, sodium alpha $C_{12-14}$ olefin sulfonate, sodium hexadecane-1 sulfonate, sodium ethyl oleate sulfonate, potassium octadecenylsuccinate, sodium oleate, potassium oleate, potassium laurate, triethanolamine myristate, morpholinium tallate, sodium tallate, lithium tallate, potassium tallate, sodium lauryl sulfate, diethanolamine lauryl sulfate, sodium laureth (3) sulfate, ammonium laureth (2) sulfate, sodium nonylphenoxypoly(ethyleneoxy)(4) sulfate, sodium diisobutylsulfosuccinate, disodium laurylsulfosuccinate, tetrasodium N-laurylsulfosuccinimate, sodium decyloxypoly(ethyleneoxy(5)methyl) carboxylate, sodium octylphenoxypoly(ethyleneoxy(8)methyl)carboxylate, sodium mono decyloxypoly(ethyleneoxy)(4)phosphate, sodium di decyloxypoly(ethyleneoxy)(6) phosphate, and potassium mono/di octylphenoxypoly(ethyleneoxy)(9)phosphate.

Examples of suitable nonionic surfactants include, but are not limited to, octylphenoxypoly(ethyleneoxy)(11)ethanol, nonylphenoxypoly(ethyleneoxy)(13)ethanol, dodecylphenoxypoly(ethyleneoxy)(10)ethanol, polyoxyethylene (12) lauryl alcohol, polyoxyethylene (14) tridecyl alcohol, lauryloxypoly(ethyleneoxy)(10)ethyl methyl ether, undecylthiopoly(ethyleneoxy) (12)ethanol, methoxypoly(oxyethylene (10)/(oxypropylene(20))-2-propanol block copolymer, nonyloxypoly(propyleneoxy)(4)/(ethyleneoxy)(16)ethanol, dodecyl polyglycoside, polyoxyethylene (9) monolaurate, polyoxyethylene (8) monoundecanoate, polyoxyethylene (20) sorbitan monostearate, polyoxyethylene (18) sorbitol monotallate, sucrose monolaurate, lauryldimethylamine oxide, myristyldimethylamine oxide, lauramidopropyl-N,N-dimethylamine oxide, tall oil fatty acid, 1:1 lauric diethanolamide, 1:1 coconut diethanolamide, 1:1 mixed fatty acid diethanolamide, polyoxyethylene(6)lauramide, 1:1 soya diethanolamidopoly(ethyleneoxy) (8) ethanol, coconut diethanolamide, "modified", and coconut diethanolamide, "long chain modified".

Examples of suitable cationic surfactants include, but are not limited to, a mixture of n-alkyl ($C_{12}$ 50 wt. %, $C_{14}$ 30 wt. %, $C_{16}$ 17 wt. %, $C_{18}$ 3 wt. %) dimethyl ethylbenzyl ammonium chlorides, hexadecyltrimethylammonium methylsulfate, didecyldimethylammonium bromide and a mixture of n-alkyl (68 wt. % $C_{12}$, 32 wt. % $C_{14}$) dimethyl benzyl ammonium chlorides.

Examples of suitable amphoteric surfactants include, but are not limited to, cocamidopropyl betaine, sodium palmityloamphopropionate, N-coco beta-aminopropionic acid, disodium N-lauryliminodipropionate, sodium coco imidazoline amphoglycinate and coco betaine.

In one embodiment, the surfactant is an anionic surfactant, such as a salt of fatty acid having 12 to 20 carbon atoms. In a further embodiment, the surfactant is potassium tallate.

The content of the surfactant to be used in the organic residue remover composition may range from about 3.5 wt. % to about 11.5 wt. %, preferably from about 4.5 wt. % to about 9.5 wt. %, and most preferably from about 5.5 wt. % to about 7 wt. %, based on the total weight of the organic residue remover composition. Preferably, the surfactant is 5, 6 or 7 wt. % potassium tallate.

Component (f): at Least One Hydrotrope

The term "hydrotrope," as used herein, refers to a compound that increases the solubility in water of another material which is only partially water soluble, and can be certain organic solvents and surfactants. Typically, hydrotropes consist of a hydrophilic part and a hydrophobic part wherein the hydrophobic part is generally too small to cause spontaneous self-aggregation.

The hydrotrope, when used in the organic residue remover composition, may help prevent phase separation of the organic residue remover composition due to heat, especially during transportation.

The hydrotrope may include certain surfactants described herein. In an embodiment, the hydrotrope includes sodium, potassium or ammonium salts of xylene sulfonate; sodium, potassium or ammonium salts of toluene sulfonate; sodium, potassium or ammonium salts of alkyl naphthalene sulfonates; sodium, potassium or ammonium salts of alkyl sulfonates having 6 to 12 carbon atoms; and sodium, potassium or ammonium salts of carboxylic acids having 6 to 12 carbon atoms. In a further embodiment, the hydrotrope is sodium salt of xylene sulfonate. The hydrotrope may be used in the form of an aqueous solution.

The content of the hydrotrope, if used in the organic residue remover composition, may range from about 0.1 wt. % to about 2 wt. %, preferably from about 0.2 wt. % to about 1 wt. %, and most preferably from about 0.3 wt. % to about 0.7 wt. %, based on the total weight of the organic residue remover composition. Preferably, the hydrotrope is 0.5, 1 or 1.5 wt. % sodium xylene sulfonate added as an aqueous solution of 60 wt. % water and 40 wt. % sodium xylene sulfonate.

Component (g): Water

There are no specific requirements for the type of water to be used in the organic residue remover composition. Examples include, but are not limited to, deionized water, reverse osmosis treated water, distilled water and tap water.

The organic residue remover composition contains at least 50 wt. % of water, based on the total weight of the composition. In an embodiment, the content of water in the composition may range from about 56 wt. % to about 86 wt. %, preferably from about 62 wt. % to about 81 wt. %, and most preferably from about 68 wt. % to about 76 wt. %, based on the total weight of the composition. In a preferred embodiment, the organic residue remover composition includes 70, 71 or 72 wt. % water.

The organic residue remover composition may be prepared by mixing its components in any order.

The organic residue remover composition preferably is a clear single phase solution or it can be a micro-emulsion (a mixture of two or more separated phases which may be a clear solution or have a milky color or appearance). Furthermore, the organic residue remover composition is preferably stable during storage and/or at temperatures up to 50° C. The organic residue remover composition is preferably a low volatile organic compound (VOC) water based formula. In an embodiment, the composition has a VOC of about 5 wt. % or less, and preferably about 4 wt. % or less, which meets the current California state regulations on VOC.

The organic residue remover composition preferably does not contain harsh chemicals and does not generate offensive fumes when in use. The organic residue remover composition can be used to clean a wide range of contaminates from very oily type soils to very watery contaminates, for example, grease, tar, adhesive, dried latex paint, pen and marker ink, grime, oil, shoe polish, makeup, food stains such as ketchup, cool-aid and coffee, and a wide variety of other organic residues and stains.

Moreover, the organic residue remover composition can be used to remove stains on various surfaces, for example, hard surfaces such as fully cured varnished and oil-base painted surfaces, vinyl baseboard, laminated counter tops, vinyl floors, solid vinyl upholstery, all metals, glass, brick, wood, concrete, grout, vinyl tops, fiberglass; carpet upholstery such as nylon, polypropylene, and wool carpets; and clothing such as most fabrics.

The organic residue remover composition can be sprayed directly on the surface to be cleaned and wiped off with a clean cloth or towel after which the surface can be cleaned with soap and water. For older, more difficult organic residues, the organic residue remover composition can be sprayed on the surface to be cleaned and allowed to stand for a few minutes before wiping dry. For fabric such as upholstery, the organic residue remover composition can be sprayed on a dry cloth, which then can be used to blot the stain, clean the stained area with soap and water, rinse the area with water, and blot dry with a clean towel. For clothing, a small amount of the organic residue remover composition can be applied to the stain, allowed to penetrate until the stain dissolves and blot clean with an absorbent cloth and launder as usual. The organic residue remover composition would not be used on water sensitive materials such as leather and silk.

The organic residue remover composition is further described in the following non-limiting examples.

EXAMPLES

1. Preparation of Organic Residue Remover Compositions

The organic residue remover composition is prepared by mixing methyl soyate, diethylene glycol monobutyl ether, 2-butoxyethanol, propylene glycol monophenyl ether, benzyl alcohol, potassium tallate, sodium xylene sulfonate, and water together to form an aqueous solution.

For example, the organic residue remover composition can be prepared by adding methyl soyate in an amount of about 4 wt. % to about 8 wt. %, based on the total weight of the composition, diethylene glycol monobutyl ether in an amount of about 1.5 wt. % to about 3 wt. %, based on the total weight of the composition, 2-butoxyethanol in an amount of about 3.5 wt. % to about 4.5 wt. %, based on the total weight of the composition, propylene glycol monophenyl ether in an amount of about 1.5 wt. % to about 3 wt. %, based on the total weight of the composition, benzyl alcohol in an amount of about 7.5 wt. % to about 9 wt. %, based on the total weight of the composition, potassium tallate in an mount of about 5.5 wt. % to about 7 wt. %, based on the total weight of the composition, sodium xylene sulfonate in an amount of about 0.3 wt. % to about 0.7 wt. %, based on the total weight of the composition, and water in an amount of about 68 wt. % to about 76 wt. %, based on the total weight of the composition.

Specifically, an organic residue remover composition was prepared by mixing the following ingredients:

6.0 wt. % of methyl soyate;
2.0 wt. % of diethylene glycol monobutyl ether;
4.0 wt. % of 2-butoxyethanol;
2.0 wt. % of propylene glycol monophenyl ether (DOWANOL PPH);
8.0 wt. % of benzyl alcohol;
6.0 wt. % of potassium tallate;
1.0 wt. % of sodium xylene sulfonate (40 wt. % aqueous solution); and
71 wt. % of water.

2. Various Organic Residue Remover Compositions are Used for Organic Residue Removal.

Various organic residue remover compositions are prepared as shown in the following tables and tested to clean off various stains on standard scrub charts (White Scrub Test charts, Item # P122-10N, available from Gardco), by wiping the surfaces with a cloth containing the organic residue remover compositions (number of strokes to clean out the organic residue are recorded):

TABLE 1

|  | Example 1 | Example 2 | Example 3 | Example 4 | Example 5 |
|---|---|---|---|---|---|
| Methyl soyate content (wt %) | 0 | 2.0 | 4.0 | 6.0 | 8.0 |
| Diethylene glycol monobutyl ether content (wt %) | 2.0 | 2.0 | 2.0 | 2.0 | 2.0 |
| 2-Butoxyethanol content (wt %) | 4.0 | 4.0 | 4.0 | 4.0 | 4.0 |
| Propylene glycol monophenyl ether content (wt %) | 2.0 | 2.0 | 2.0 | 2.0 | 2.0 |
| Benzyl alcohol content (wt %) | 8.0 | 8.0 | 8.0 | 8.0 | 8.0 |
| Potassium tallate content (wt %) | 6.0 | 6.0 | 6.0 | 6.0 | 6.0 |
| Sodium xylene sulfonate (40 wt. % aqueous solution) content (wt %) | 1.0 | 1.0 | 1.0 | 1.0 | 1.0 |
| Water content (wt %) | 77 | 75 | 73 | 71 | 69 |

TABLE 2

|  | Example 1 | Example 2 | Example 3 | Example 4 | Example 5 |
|---|---|---|---|---|---|
| Crayon | 35 | 40 | 30 | 23 | * |
| Ink | 10 | 7 | 4 | 2 | * |
| Adhesive | 30 | 18 | 8 | 6 | * |
| Tar | >100 | 70 | 40 | 15 | * |
| Latex | 25 | 34 | 28 | 24 | * |
| Permanent Magic marker | 18 | 17 | 10 | 5 | * |

* not tested due to phase separation of the resulting composition.

As the results in Table 2 show, 2 to 6 wt. % methyl soyate is particularly effective in removing ink, adhesive, tar and permanent magic marker. With 4 to 6 wt. % methyl soyate, removal of adhesive and permanent magic marker is improved.

TABLE 3

|  | Example 6 | Example 7 | Example 8 | Example 9 | Example 10 |
|---|---|---|---|---|---|
| Methyl soyate content (wt %) | 6.0 | 6.0 | 6.0 | 6.0 | 6.0 |
| Diethylene glycol | 2.0 | 2.0 | 2.0 | 2.0 | 2.0 |

TABLE 3-continued

|  | Example 6 | Example 7 | Example 8 | Example 9 | Example 10 |
|---|---|---|---|---|---|
| monobutyl ether content (wt %) |  |  |  |  |  |
| 2-Butoxyethanol content (wt %) | 4.0 | 4.0 | 4.0 | 4.0 | 4.0 |
| Propylene glycol monophenyl ether content (wt %) | 0 | 1.0 | 2.0 | 3.0 | 4.0 |
| Benzyl alcohol content (wt %) | 8.0 | 8.0 | 8.0 | 8.0 | 8.0 |
| Potassium tallate content (wt %) | 6.0 | 6.0 | 6.0 | 6.0 | 6.0 |
| Sodium xylene sulfonate (40 wt. % aqueous solution) content (wt %) | 1.0 | 1.0 | 1.0 | 1.0 | 1.0 |
| Water content (wt %) | 73 | 72 | 71 | 70 | 69 |

TABLE 4

|  | Example 6 | Example 7 | Example 8 | Example 9 | Example 10 |
|---|---|---|---|---|---|
| Crayon | 25 | 21 | 19 | 22 | 17 |
| Ink | 11 | 5 | 2 | 2 | 2 |
| Adhesive | 20 | 16 | 14 | 15 | 15 |
| Tar | 29 | 30 | 20 | 19 | 17 |
| Latex | 25 | 22 | 22 | 26 | 30 |
| Permanent Magic marker | 17 | 7 | 7 | 4 | 4 |

As the results in Table 4 show, propylene glycol monophenyl ether in amounts of 1 to 4 wt. % is particularly effective in removing ink, permanent magic marker and tar. With 3 to 4 wt. % propylene glycol monophenyl ether, removal of permanent magic marker is improved compared to 1 to 2 wt. % additions.

TABLE 5

|  | Example 11 | Example 12 | Example 13 | Example 14 |
|---|---|---|---|---|
| Methyl soyate content (wt %) | 6.0 | 6.0 | 6.0 | 6.0 |
| Diethylene glycol monobutyl ether content (wt %) | 2.0 | 2.0 | 2.0 | 2.0 |
| 2-Butoxyethanol content (wt %) | 4.0 | 4.0 | 4.0 | 4.0 |
| Propylene glycol monophenyl ether content (wt %) | 2.0 | 2.0 | 2.0 | 2.0 |
| Benzyl alcohol content (wt %) | 4.0 | 6.0 | 8.0 | 10.0 |
| Potassium tallate content (wt %) | 6.0 | 6.0 | 6.0 | 6.0 |
| Sodium xylene sulfonate (40 wt. % aqueous solution) content (wt %) | 1.0 | 1.0 | 1.0 | 1.0 |
| Water content (wt %) | 75 | 73 | 71 | 69 |

TABLE 6

|  | Example 11 | Example 12 | Example 13 | Example 14 |
|---|---|---|---|---|
| Crayon | 30 | 35 | 17 | 28 |
| Ink | >100 | >100 | 4 | 3 |
| Adhesive | 11 | 11 | 11 | 10 |
| Tar | 45 | 27 | 22 | 27 |
| Latex | 35 | 33 | 26 | 19 |
| Permanent Magic marker | 56 | 40 | 8 | 17 |

As the results in Table 6 show, 8 to 10 wt % benzyl alcohol is particularly effective in removing tar, ink, magic marker and latex. Substantial improvement in tar removal is noted when the amount of benzyl alcohol increases from 4 to 6 wt. %.

TABLE 7

|  | Example 15 | Example 16 | Example 17 | Example 18 | Example 19 |
|---|---|---|---|---|---|
| Methyl soyate content (wt %) | 6.0 | 6.0 | 6.0 | 6.0 | 6.0 |
| Diethylene glycol monobutyl ether content (wt %) | 0 | 2.0 | 4.0 | 6.0 | 8.0 |
| 2-Butoxyethanol content (wt %) | 4.0 | 4.0 | 4.0 | 4.0 | 4.0 |
| Propylene glycol monophenyl ether content (wt %) | 2.0 | 2.0 | 2.0 | 2.0 | 2.0 |
| Benzyl alcohol content (wt %) | 8.0 | 8.0 | 8.0 | 8.0 | 8.0 |
| Potassium tallate content (wt %) | 6.0 | 6.0 | 6.0 | 6.0 | 6.0 |
| Sodium xylene sulfonate (40 wt. % aqueous solution) content (wt %) | 1.0 | 1.0 | 1.0 | 1.0 | 1.0 |
| Water content (wt %) | 73 | 71 | 69 | 67 | 65 |

TABLE 8

|  | Example 15 | Example 16 | Example 17 | Example 18 | Example 19 |
|---|---|---|---|---|---|
| Crayon | 27 | 21 | 17 | 21 | 10 |
| Ink | >100 | 60 | 4 | 8 | 7 |
| Adhesive | 17 | 13 | 10 | 8 | 7 |
| Tar | 20 | 19 | 19 | 18 | 23 |
| Latex | 25 | 24 | 25 | 25 | 26 |
| Permanent Magic marker | 8 | 7 | 7 | 7 | 7 |

As the results in Table 8 show, addition of 2 to 8 wt. % diethylene glycol monobutyl ether is particularly effective in removing ink, especially when 4 to 8 wt. % diethylene glycol monobutyl ether is added. Substantial improvement in crayon removal is noted with 8 wt. % additions of diethylene glycol monobutyl ether. Likewise, better adhesive removal is noted at 6 to 8 wt. % additions of diethylene glycol monobutyl ether. However, the addition of diethylene glycol monobutyl ether has little effect on removal of tar, latex and permanent magic marker.

While the invention has been described with reference to specific embodiments, variations and modifications may be made without departing from the spirit and the scope of the invention. Such variations and modifications are to be considered within the purview and scope of the invention as defined by the appended claims.

What is claimed is:

1. An organic residue remover composition obtained by mixing:
   component (a): at least one water insoluble hydrophobic compound in an amount of about 2 wt. % to about 10 wt. %, based on the total weight of the composition,
   component (b): at least one water soluble glycol ether in an amount of about 3 wt. % to about 10 wt. %, based on the total weight of the composition,
   component (c): at least one water insoluble glycol ether in an amount of about 1 wt. % to about 4 wt. %, based on the total weight of the composition,
   component (d): at least one aromatic alcohol in an amount of about 7 wt. % to about 10 wt. %, based on the total weight of the composition,
   component (e): at least one surfactant in an amount of about 3.5 wt. % to about 11.5 wt. %, based on the total weight of the composition,
   optionally component (f): at least one hydrotrope in an amount of about 0.1 wt. % to about 2 wt. %, based on the total weight of the composition, and
   component (g): water in an amount of about 56 wt. % to about 86 wt. %, based on the total weight of the composition.

2. The organic residue remover composition as claimed in claim 1, wherein the organic residue remover composition has a volatile organic compound (VOC) of about 5 wt. % or less.

3. The organic residue remover composition as claimed in claim 1, wherein the organic residue remover composition has a volatile organic compound (VOC) of about 4 wt. % or less.

4. The organic residue remover composition as claimed in claim 1,
   wherein: (i) component (a) comprises a methyl ester of fatty acid having 12 to 20 carbon atoms; (ii) component (b) comprises a mixture of a low vapor pressure volatile organic compound (VOC) water soluble glycol ether and a VOC water soluble glycol ether; (iii) component (e) comprises an anionic surfactant; and/or (iv) component (f) comprises sodium, potassium or ammonium salts of xylene sulfonate; sodium, potassium or ammonium salts of toluene sulfonate; sodium, potassium or ammonium salts of alkyl naphthalene sulfonates; sodium, potassium or ammonium salts of alkyl sulfonates having 6 to 12 carbon atoms; and sodium, potassium or ammonium salts of carboxylic acids having 6 to 12 carbon atoms.

5. The organic residue remover composition as claimed in claim 1,
   wherein: (i) component (a) comprises methyl soyate; (ii) component (b) comprises diethylene glycol monobutyl ether and optionally 2-butoxyethanol; (iii) component (c) comprises propylene glycol monophenyl ether; (iv) component (d) comprises benzyl alcohol; (v) component (e) comprises potassium tallate; and/or (vi) component (f) comprises sodium xylene sulfonate.

6. An organic residue remover composition obtained by mixing methyl soyate, diethylene glycol monobutyl ether, optionally 2-butoxyethanol, propylene glycol monophenyl ether, benzyl alcohol, potassium tallate, sodium xylene sulfonate, and water together to form an aqueous solution.

7. The organic residue remover composition as claimed in claim 6, wherein methyl soyate is added in an amount of about 4 wt. % to about 8 wt. %, based on the total weight of the composition, diethylene glycol monobutyl ether is added in an amount of about 1.5 wt. % to about 3 wt. %, based on the total weight of the composition, 2-butoxyethanol is added in an amount of about 3.5 wt. % to about 4.5 wt. %, based on the total weight of the composition, propylene glycol monophenyl ether is added in an amount of about 1.5 wt. % to about 3 wt. %, based on the total weight of the composition, benzyl alcohol is added in an amount of about 7.5 wt. % to about 9 wt. %, based on the total weight of the composition, potassium tallate is added in an mount amount of about 5.5 wt. % to about 7 wt. %, based on the total weight of the composition, sodium xylene sulfonate is added in an amount of about 0.3 wt. % to about 0.7 wt. %, based on the total weight of the composition, and water is added in an amount of about 68 wt. % to about 76 wt. %, based on the total weight of the composition.

8. A method for preparing an organic residue remover composition, comprising mixing:
   component (a): at least one hydrophobic compound in an amount of about 2 wt. % to about 10 wt. %, based on the total weight of the composition,
   component (b): at least one water soluble glycol ether in an amount of about 3 wt. % to about 10 wt. %, based on the total weight of the composition,
   component (c): at least one water insoluble glycol ether in an amount of about 1 wt. % to about 4 wt. %, based on the total weight of the composition,
   component (d): at least one aromatic alcohol in an amount of about 7 wt. % to about 10 wt. %, based on the total weight of the composition,
   component (e): at least one surfactant in an amount of about 3.5 wt. % to about 11.5 wt. %, based on the total weight of the composition,
   component (f): optionally at least one hydrotrope in an amount of about 0.1 wt. % to about 2 wt. %, based on the total weight of the composition, and
   component (g): water in an amount of about 56 wt. % to about 86 wt. %, based on the total weight of the composition,
   wherein each component or an ingredient thereof is different from the other components or ingredients thereof in the organic residue remover composition.

9. The method of claim 8, wherein component (b) comprises a mixture of a low vapor pressure volatile organic compound (VOC) water soluble glycol ether in an amount of about 1 wt. % to about 10 wt. %, based on the total weight of the composition, and a VOC water soluble glycol ether in an amount of 0 wt. % to about 6 wt. %, based on the total weight of the composition.

10. A method for cleaning an organic residue from a surface, comprising spraying the organic residue remover composition of claim 1 on the surface and wiping or blotting the surface with a cloth.

11. The method as claimed in claim 10, wherein the surface is a hard surface or a fabric.

12. The method as claimed in claim 10, wherein the organic residue contains grease, crayon, ink, adhesive, tar, latex, permanent magic marker and/or food stains.

13. The organic residue remover composition as claimed in claim 6, wherein methyl soyate is added in an amount of about 4 wt. % to about 8 wt. %, based on the total weight of the composition, diethylene glycol monobutyl ether is added in an amount of about 1 wt. % to about 5 wt. %, based on the total weight of the composition, 2-butoxyethanol is added in an amount of up to about 2 wt. %, based on the total weight of the composition, propylene glycol monophenyl ether is added in an amount of about 1.5 wt. % to about 3 wt. %, based on the total weight of the composition, benzyl alcohol is added in an amount of about 7.5 wt. % to about 9 wt. %, based on the total weight of the composition, a potassium salt of a C16-C18 fatty acid is added in an amount of about 5.5 wt. % to about 7 wt. %, based on the total weight of the composition, sodium xylene sulfonate is added in an amount of about 0.3 wt. % to about 0.7 wt. %, based on the total weight of the composition, and water is added in an amount of about 68 wt. % to about 76 wt. %, based on the total weight of the composition.

14. An organic residue remover composition obtained by mixing methyl soyate, diethylene glycol monobutyl ether, optionally 2-butoxyethanol, propylene glycol monophenyl ether, benzyl alcohol, a potassium salt of a C16-C18 fatty acid, sodium xylene sulfonate, and water together to form an aqueous solution.

15. An organic residue remover composition obtained by mixing:
    component (a): at least one water insoluble hydrophobic compound comprising a methyl ester of a fatty acid having 12 to 20 carbon atoms, the water insoluble hydrophobic compound present in an amount of about 2 wt. % to about 10 wt. %, based on the total weight of the composition,
    component (b): at least one water soluble glycol ether comprising a mixture of a low vapor pressure volatile organic compound (VOC) water soluble glycol ether and a VOC water soluble glycol ether, the mixture present in an amount of about 3 wt. % to about 10 wt. %, based on the total weight of the composition,
    component (c): at least one water insoluble glycol ether in an amount of about 1 wt. % to about 4 wt. %, based on the total weight of the composition,
    component (d): at least one aromatic alcohol in an amount of about 7 wt. % to about 10 wt. %, based on the total weight of the composition,
    component (e): at least one anionic surfactant in an amount of about 3.5 wt. % to about 11.5 wt. %, based on the total weight of the composition,
    optionally component (f): at least one hydrotrope in an amount of about 0.1 wt. % to about 2 wt. %, based on the total weight of the composition, the hydrotrope comprising:
        sodium, potassium or ammonium salts of xylene sulfonate;
        sodium, potassium or ammonium salts of toluene sulfonate;
        sodium, potassium or ammonium salts of alkyl naphthalene sulfonates;
        sodium, potassium or ammonium salts of alkyl sulfonates having 6 to 12 carbon atoms; or
        sodium, potassium or ammonium salts of carboxylic acids having 6 to 12 carbon atoms; and
    component (g): water in an amount of about 56 wt. % to about 86 wt. %, based on the total weight of the composition.

* * * * *